United States Patent
Halpern et al.

(10) Patent No.: US 7,529,818 B2
(45) Date of Patent: May 5, 2009

(54) SYSTEM AND METHOD FOR PERFORMING VALIDATION OF A CONFIGURATION

(75) Inventors: Eric M. Halpern, San Francisco, CA (US); Mark Spotswood, San Francisco, CA (US); Charles Paclat, Medford, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 772 days.

(21) Appl. No.: 11/130,733

(22) Filed: May 17, 2005

(65) Prior Publication Data

US 2005/0262225 A1 Nov. 24, 2005

Related U.S. Application Data

(60) Provisional application No. 60/572,849, filed on May 20, 2004.

(51) Int. Cl.
*G06F 9/44* (2006.01)
*G06F 9/24* (2006.01)
*G06F 9/445* (2006.01)
*G06F 15/173* (2006.01)

(52) U.S. Cl. .............. 709/221; 709/223; 717/170; 717/176; 713/1

(58) Field of Classification Search ......... 709/203–204, 709/206–207, 217–221, 223; 705/5, 6, 1, 705/28, 26, 27; 717/170, 176; 713/1
See application file for complete search history.

(56) References Cited

U.S. PATENT DOCUMENTS

| | | |
|---|---|---|
| 5,740,431 A | 4/1998 | Rail |
| 5,742,829 A | 4/1998 | Davis |
| 5,784,612 A | 7/1998 | Crane |
| 5,838,907 A | 11/1998 | Hansen |
| 6,029,196 A | 2/2000 | Lenz |
| 6,041,347 A | 3/2000 | Harsham |
| 6,401,239 B1 * | 6/2002 | Miron ............... 707/203 |
| 6,466,972 B1 | 10/2002 | Paul |
| 6,671,695 B2 | 12/2003 | McFadden |
| 6,704,778 B1 | 3/2004 | Horman |
| 7,366,898 B2 | 4/2008 | Evans |
| 2002/0052935 A1 | 5/2002 | Paxhia |
| 2002/0188667 A1 | 12/2002 | Kirnos |
| 2003/0018732 A1 | 1/2003 | Jacobs |

(Continued)

OTHER PUBLICATIONS

Rouillard, John P., et al., "Config: A Mechanism for Installing and Tracking System Configurations," 1994 LISA, Sep. 19-23, 1994, San Diego, CA, pp. 9-17.

(Continued)

*Primary Examiner*—David R Vincent
*Assistant Examiner*—Ola Olude-Afolabi
(74) *Attorney, Agent, or Firm*—Fliesler Meyer LLP

(57) ABSTRACT

In embodiments, the present invention provides mechanisms and methods for making a set of configuration changes to a set of servers comprised of an administration server and one or more managed servers. These mechanisms and methods can enable a number of changes to be made to the configuration at once, e.g., in a batch. In such transaction based processing, embodiments process changes in batches, which enables embodiments to avoid failures in configuration changes that result in the machines being in a non-recoverable or unknown configuration state.

20 Claims, 3 Drawing Sheets

U.S. PATENT DOCUMENTS

| | | | |
|---|---|---|---|
| 2003/0023707 | A1 | 1/2003 | Ryan |
| 2003/0051010 | A1 | 3/2003 | French |
| 2003/0061247 | A1 | 3/2003 | Renaud |
| 2003/0182427 | A1 | 9/2003 | Halpern |
| 2003/0220967 | A1* | 11/2003 | Potter et al. ............. 709/203 |
| 2003/0225880 | A1* | 12/2003 | Srivastava et al. ......... 709/224 |
| 2004/0054569 | A1 | 3/2004 | Pombo |
| 2004/0073782 | A1* | 4/2004 | Price et al. ................ 713/1 |
| 2004/0098472 | A1 | 5/2004 | Styles |
| 2004/0158575 | A1 | 8/2004 | Jacquemot |
| 2005/0027846 | A1* | 2/2005 | Wolfe et al. ............. 709/223 |
| 2005/0055575 | A1 | 3/2005 | Evans |
| 2005/0144261 | A1 | 6/2005 | Nichols |
| 2005/0262495 | A1* | 11/2005 | Fung et al. ............... 717/170 |
| 2006/0206449 | A1 | 9/2006 | Fletcher |

OTHER PUBLICATIONS

Chalfant, Thomas M., "Role Based Access Control and Secure Shell—A Closer Look At Two Solaris™ Operating Environment Security Features," Sun BluePrints™ OnLine—Jun. 2003, pp. i-ii and 1-16.

Harlander, Magnus, "Central System Administration in a Heterogeneous Unix Environment: GeNUAdmin," 1994 LISA, Sep. 19-23, 1994, San Diego, CA, pp. 1-8.

Karjoth, Günter, "Access Control with IBM Tivoli Access Manager," ACM Transactions on Information and System Security, vol. 6, No. 2, May 2003, pp. 232-257.

Gomberg, Michail, et al., "Scalable, Remote Administration of Windows NT," Proceedings of LISA-NT: The $2^{nd}$ Large Installation System Administration of Windows NT Conference, Jul. 16-17, 1999, Seattle, WA, pp. 1-9.

Ferraiolo, David, et al., "Specifying and Managing Role-Based Access Control within a Corporate Intranet," RBAC '97, Fairfax, VA, 1997, pp. 77-82.

Anderson, Paul, et al., "Large Scale Linux Configuration with LCFG," Fourth Annual Linux Showcase & Conference, Oct. 10-14, 2000, Atlanta, GA, pp. 363-372.

Droms, Ralph, "Automated Configuration of TCP/IP With DHCP," IEEE Internet Computing, Jul./Aug. 1999, pp. 45-53.

Diao, Yixin, et al., "Generic Online Optimizaton of Multiple Configuration Parameters with Application to a Database Server," DSOM 2003, LNCS 2867, 2003, pp. 3-15.

* cited by examiner

SYSTEM AND METHOD FOR PERFORMING VALIDATION OF A CONFIGURATION

PRIORITY CLAIM

The present application claims priority to the following provisional application, the contents of which are incorporated by reference herein in their entirety:

U.S. Provisional Patent Application No. 60/572,849, entitled A SYSTEM AND METHOD FOR PERFORMING BEAN-TREE DIFFERENCING, by Eric M. Halpern, filed on May 20, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 11/130,696, entitled A SYSTEM AND METHOD FOR PERFORMING BATCH CONFIGURATION CHANGES, by Eric M. Halpern et al., filed on May 17, 2005, and U.S. patent application Ser. No. 09/975,590, entitled DATA REPLICATION PROTOCOL, by Dean B. Jacobs, et al., filed on Oct. 11, 2001. BEAS-01077 us2, which application claims the benefit of a U.S. Provisional Patent Application No. 60/305,986, entitled DATA REPLICATION PROTOCOL, by Dean B. Jacobs, et al., filed on July 16, 2001.

FIELD OF THE INVENTION

The current invention relates generally to implementing system configuration changes to a set of servers, and more particularly to validating a configuration changes to a set of servers.

BACKGROUND OF THE INVENTION

Application server systems often implement large networks of services and clients. The application server system may include applications distributed across a number of machines in the network. One common task is configuration management, i.e., the upgrading or changing of applications or configurations of the machines. For this to happen reliably in a distributed system, changes to the configuration of the machines must either succeed or fail in their entirety. This is because partial failure can leave the system in an inconsistent state.

In conventional approaches, changes must be made to the configuration on an attribute-by-attribute basis. Flowchart 100 of FIG. 1 illustrates one such process. As shown in FIG. 1, the administration server generates a change for an attribute (block 110). The administration server then transmits the change to all the managed servers in the set of servers to validate the change (block 120). The changed attribute is implemented and made active (block 130). If there are more attributes to change (block 140), processing continues to (block 110) where the process is repeated. Otherwise, processing of flowchart 100 completes.

However, the limitations involved with validating attribute changes individually, coupled with the fact that changing attributes often has side effects, such as triggering deployment, makes it difficult to reliably make changes using conventional means. What is needed is techniques for implementing changes in an application server architecture that overcomes the disadvantages of the prior art.

DETAILED DESCRIPTION

Figure 1:
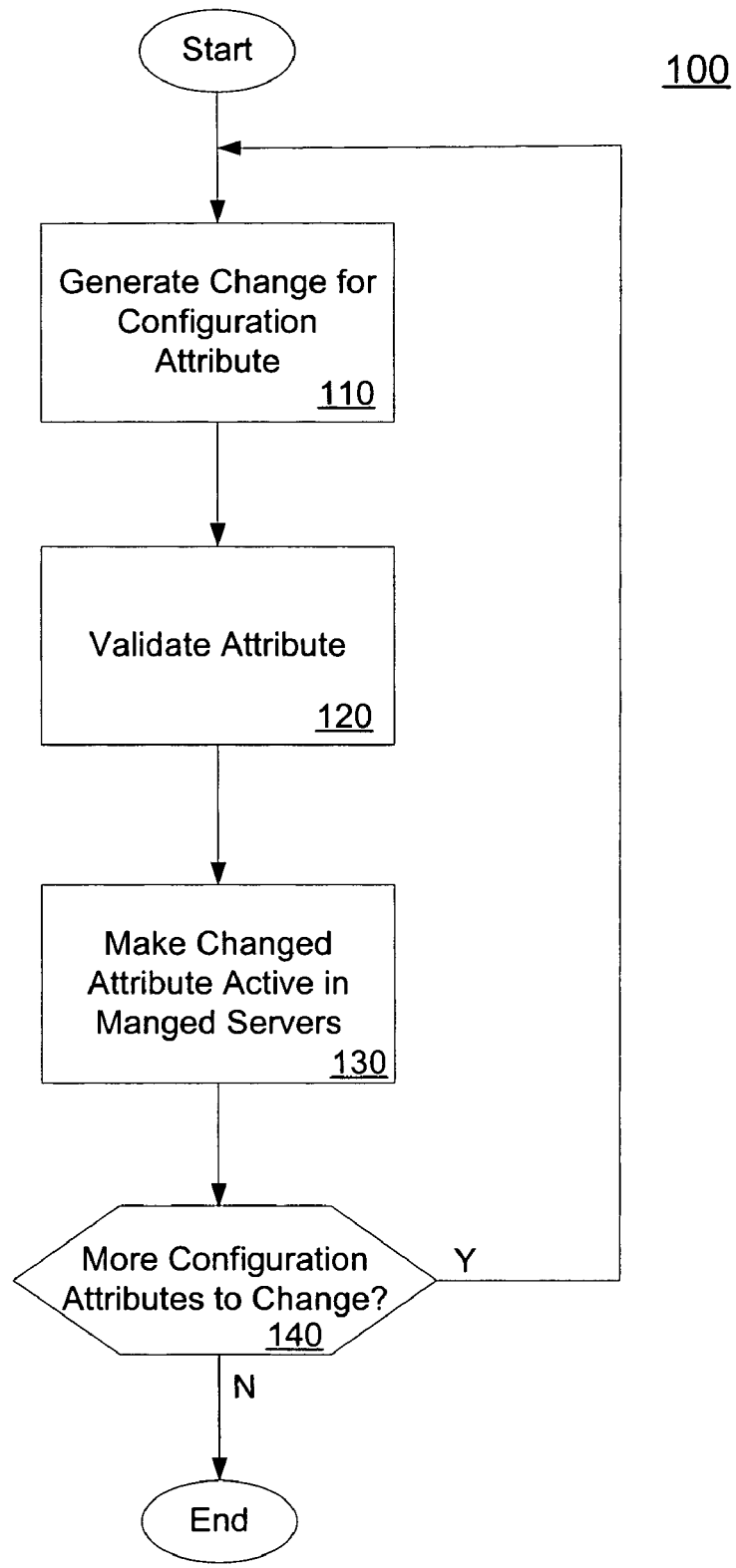
FIG. 1 is an illustration of a method for performing individual changes in accordance with the prior art.

In embodiments, the present invention provides mechanisms and methods for making a set of configuration changes to a set of servers comprised of an administration server and one or more managed servers. These mechanisms and methods can enable a number of changes to be made to the configuration at once, e.g., in a batch. The ability of an administrator to make a number of changes to the configuration, validate the changes and then persist the changes to the managed servers is termed a "transaction based" change process because changes are processed on a "transaction level" as opposed to an "individual change level". In such transaction based processing, embodiments process changes in batches, which enables embodiments to avoid failures in configuration changes that result in the machines being in a non-recoverable or unknown configuration state.

In one embodiment, the present invention provides a method for validating a set of configuration changes. The method includes receiving a set of changes to a configuration. The set of changes is compared to a configuration associated with a running state. A determination is made based upon a result of the comparison whether to accept the set of changes. At least one of an acceptance or a rejection is indicated based upon a result of the determination. In one embodiment, comparing the set of changes to a configuration associated with a running state includes comparing the set of changes to a configuration MBean in an MBean graph.

In an embodiment, a set of changes may be distributed to a set of servers affected by the changes in a controlled manner. Each server has an opportunity to compare the system configuration change to the running state of the server and determine if the server is able to accept the change. The servers then return a signal to the administration server indicating whether each server accepts its proposed change. In one embodiment, if all servers accept the configuration change, then the administration server activates the changes on the servers.

In one embodiment, an administrator makes configuration changes to staging environment, i.e., a non-production test set of servers in which changes may be applied and tested, prior to distributing the changes to a live environment, i.e., the set of servers in which actual requests are served. The administrator interacts with the administration server via an interface that may be made simple, transparent, and robust. The interface includes mechanisms that allow the administrator to track the progress of changes. Accordingly, embodiments of the present invention can provide greater explicitness than conventional approaches. The actions of editing, saving and distributing configuration in a transaction based embodiment can enable a plurality of changes to be made "discretely visible", i.e., capable of being viewed by the servers only as a batch of changes.

In one embodiment, persisted changes are not automatically applied to a running system. These changes are simply written to a working version of the configuration. That working version can again be locked, edited and persisted. This approach allows multiple users to sequentially make edits to the configuration before the edits are activated.

The act of starting the distribution process of a configuration to the managed servers is termed activation. When successful distribution and validation of the configuration to all of the managed servers is achieved, the configuration is considered to be the activated. During the distribution process, an activation task is maintained which provides the user with feedback as to the progress of the distribution to each of the managed servers. In the event that the configuration is not successfully delivered to all the managed servers, the configuration is returned to the unmodified state. In that case additional modifications can be made to correct any problems and another attempt can be made to activate the configuration.

Even though a configuration has been accepted by all of the managed servers and is considered activated there are some changes that cannot be applied unless the server is restarted. Such a server is in a state that is "pending" reboot. The administrator is provided a mechanism to determine which servers require a reboot and to track the servers that have completed.

In one embodiment, the configuration is managed as a single resource that must be locked before it can be accessed. In one embodiment, a "Single-Writer" model can be enforced in which only one administrator at a time is allowed access to the configuration for purposes of writing. Thus, multiple users will be blocked from executing concurrent changes to the configuration in such an embodiment.

Figure 2:
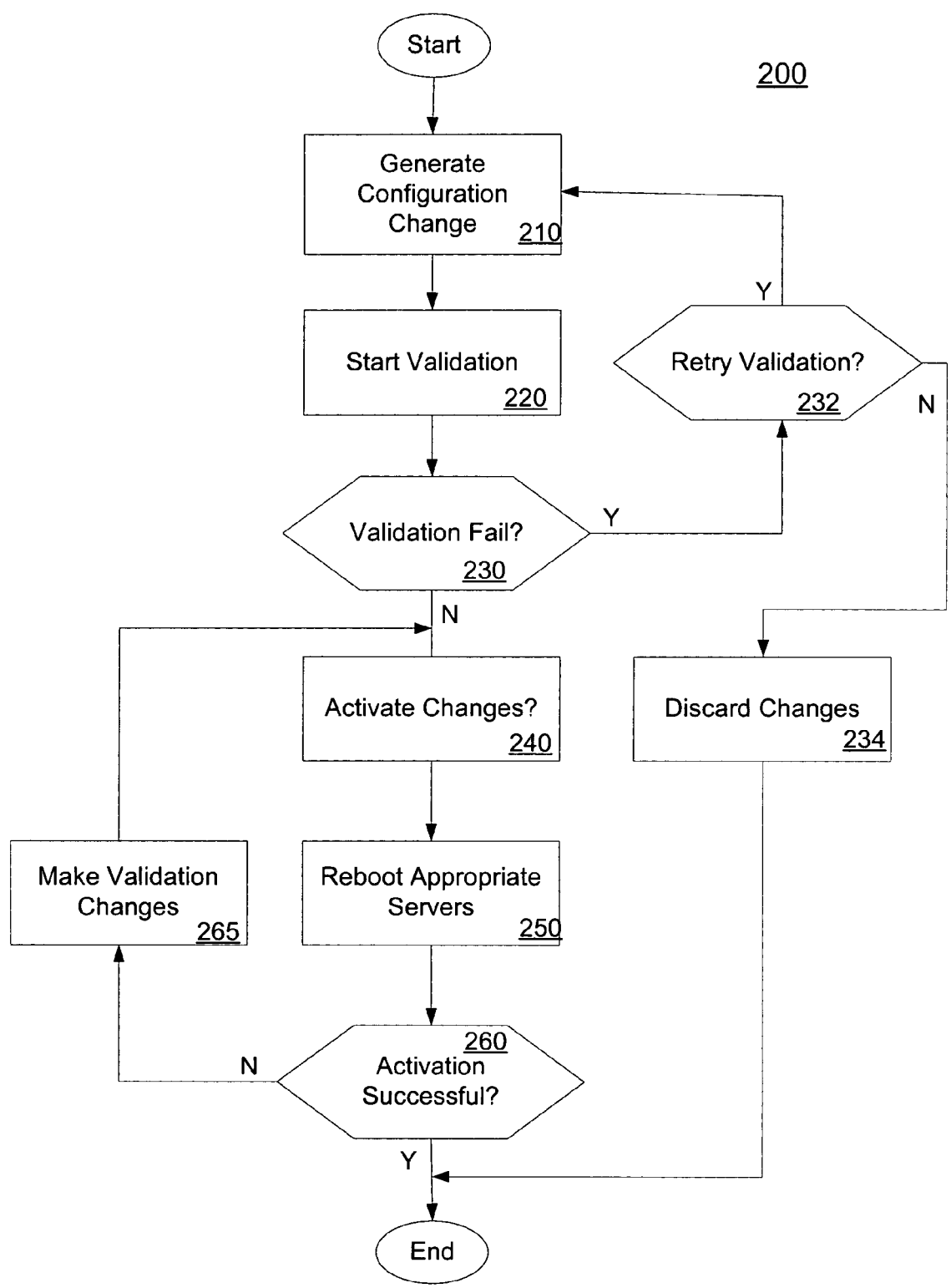
FIG. 2 is an illustration of a process for performing batch configuration changes across a set of servers in accordance with an embodiment.

FIG. 2 illustrates a flowchart 200 of a process for performing a batch configuration change in accordance with an embodiment. As shown by FIG. 2, a system configuration change is generated (block 210). In one embodiment, the system configuration change is a change to the system configuration file by the administration server. Next, the system configuration change is validated (block 220). Validation includes the transmittal of the system configuration changes from the administration server to one or more managed servers affected by the change. In one embodiment, the managed servers receiving the system configuration change are the managed servers that the administration server deems will be affected by the system configuration change, or the involved managed servers. In one embodiment, a data replication service (DRS) mechanism may be used to transmit the configuration changes from the administration server to the managed server. DRS is disclosed in "Data Replication Protocol", U.S. patent application Ser. No. 09/975,590, filed Jul. 16, 2001, which is incorporated herein by reference. The managed servers determine whether the configuration changes are acceptable and whether to validate the system configuration change for that managed server. In one embodiment, a managed server makes the determination by comparing the received configuration information to a configuration located on the managed server as illustrated in flowchart 300 of FIG. 3.

Figure 3:
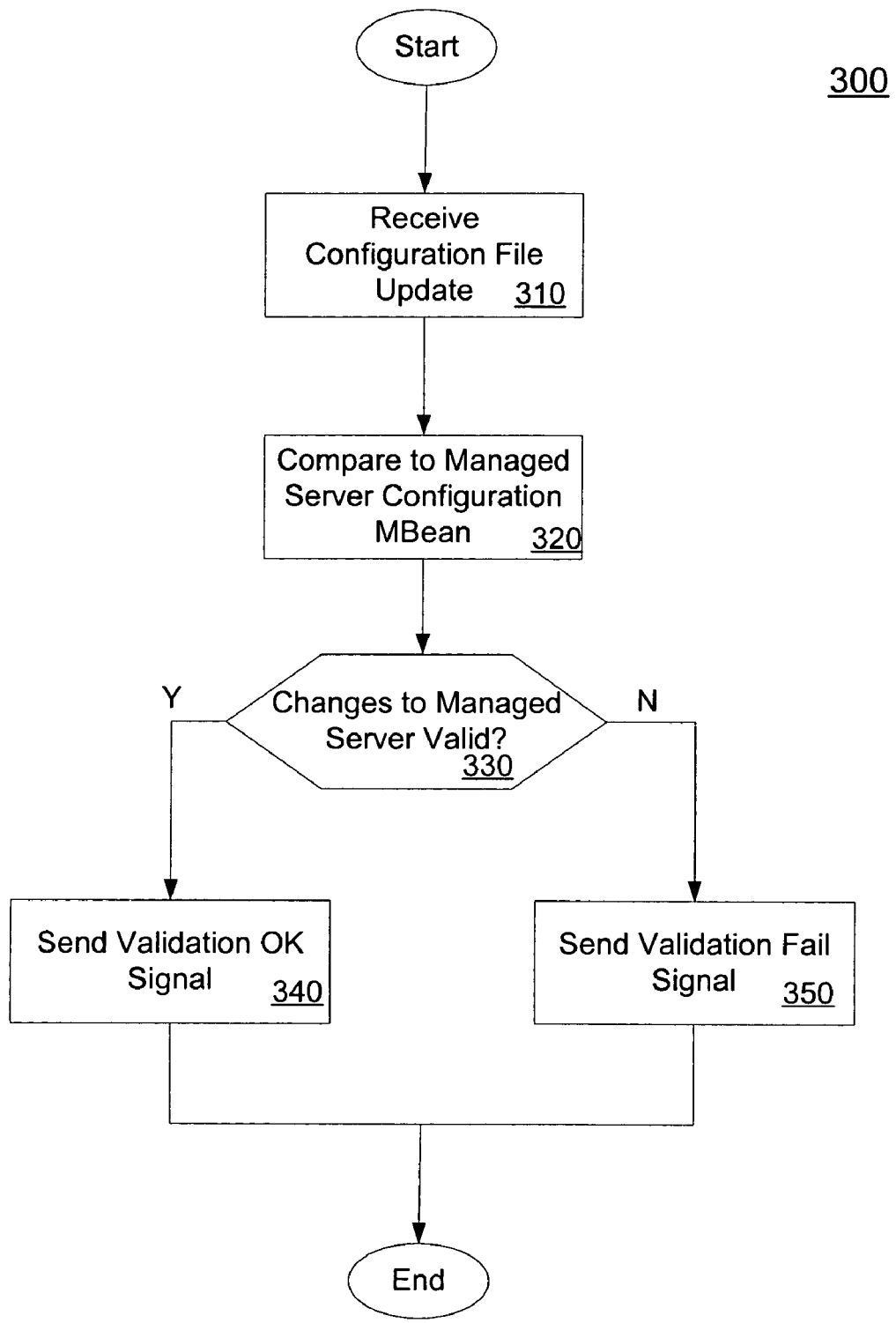
FIG. 3 is an illustration of a process for validating a configuration in accordance with an embodiment.

In one embodiment, configuration change validation can be performed using an MBean tree differencing mechanism illustrated by flowchart 300 for the configuration comparison. An MBean is an object and properties associated with the object. For example, MBeans used in an embodiment comprise properties of: 1) primitives, i.e., integer, string, Boolean, or array of one or more of these primitives; and 2) child beans, i.e., a nested configuration structure. In MBean tree differencing, the persisted configuration is retrieved into one or more MBeans related to one another by a graph, tree or similar data structure, which may be used for the comparison processing. As shown in FIG. 3, the system configuration file update is received (block 310). In one embodiment, the system configuration file update includes an entire configuration with updates applied. The received configuration file update is then compared to a configuration MBean located on the server (block 320). Upon comparing the received configuration information and the configuration MBean, the managed server may determine what needs to be changed in the MBean and if the MBean changes are valid, or will be acceptable to the MBean (block 330). In one embodiment, the system configuration changes will be acceptable and will be validated if they do not cause any errors or cause the managed server to enter into an error state. If the changes are validated, the managed server sends a validation ok signal to the administration server (block 340). If validation fails and the changes are not accepted, the managed server sends a validation fail signal to the administration server (block 350). In either case, the processing illustrated by flowchart 300 completes.

In an embodiment, comparing the configuration file update to a configuration MBean located on the server (block 320) proceeds with the managed server reading the configuration file update into an MBean graph. The managed server starts with the root of the MBean graph and performs a depth first traversal of the graph. At each MBean node, the managed server compares the primitives of the MBean node with those of the present current configuration stored at the managed server. Any changes, including additions and deletions of primitives are stored in a list of events, which may be played against the current configuration MBean graph to yield the updated configuration MBean graph. Such comparison processing at the MBean level enables embodiments to process more efficiently than comparing configurations in a persisted format, such as extended markup language (XML) for example.

Continuing now with FIG. 2, the managed server determines whether or not to accept the change and thereby complete the validation process for the change (block 230). In one embodiment, if one or more managed servers reply to the administration server with a validation fail signal, the administration server may determine that the validation attempt has failed (block 230). If the administration server determines the validation attempt has failed, the administration server may send a fail signal to the managed servers involved and determine whether or not to retry the validation (block 232). If a retry is attempted, operation continues to block 210 where a configuration change is generated (the configuration may be the same system configuration change or a different system configuration change). If no retry is to be attempted for the failed validation, the administration system discards the changes (block 234) and processing of flowchart 200 completes (block 265).

If the validation attempt is determined to be acceptable (block 230), the changes are activated (block 240). In one embodiment, activation of the changes includes the administration server sending an activation signal to each of the involved managed servers. In one embodiment, some of the system configuration changes will require a reboot of one or more managed servers. In this case, the necessary managed servers will be rebooted at optional block 250. The administration server will then determine whether the activation of the system configuration change was successful (block 260). The activation is not successful if the server is thrown into an error state as a result of the system configuration change. If the activation is determined to be successful, operation completes. If the activation is not successful, operation continues to block 265 where changes can be made to the system configuration batch change and the activation can be attempted again (block 240).

For exemplary purposes, some programming specifics and examples of the present invention will now be discussed with reference to BEA's Weblogic® Server Application server system. In one embodiment, a configuration management API is provided. This interface provides services that can be used to enforce grouping on a set of modifications to the WebLogic® Server.

One embodiment includes a special MBean for each domain, i.e., a set of servers, registered under the name:

"<domain_name>:name=ConfigurationManager."

These services provide the functionality required to manage change for a specific domain. Access to these services can be acquired by directly access the JMX object or by acquiring a reference to it through the DomainRuntimeMBean.

edit(int waitTimeInMillis, int timeOutInMillis): throws
    ChangeAlreadyInProgressException
getCurrentEditor( ): String
getChanges( ): TabularData
    EditTimedOutException
validate( ):void
    ValidationException
save( ):void
    EditTimedOutException
    SaveFailedException
    ValidationException
getValidationErrors( ): TabularData
undo( ): void
undoAll( ): void The edit process will attempt to lock the configuration for edit on behalf of the currently authenticated user. This process will be called prior to invoking any process that will modify configuration. Completion of a set of changes is triggered by a complementary invocation of the "save" process.

It is possible that another user has started an edit. In such cases the edit process will block for waitTimeInMillis milliseconds or until any outstanding changes are saved. If the value of waitTimeinMillis is 0 the process will return immediately if a change is outstanding. To block indefinitely a value of −1 is specified.

To avoid the possibility that the configuration is locked indefinitely it is possible to specify a timeout. The timeOutinMillis specifies the number of milliseconds after which the lock on the configuration will no longer be guaranteed. In one embodiment, this time out is enforced lazily. If another user requests an edit after the time out, the configuration changes are left intact and may be saved. If another user does request an edit access after the timeout period, the changes are automatically reverted and the lock is given to that new user. A value of −1 is specified to indicate the user does not want the edit to time out. In this case the cancelAllEdits process must be invoked to release a locked configuration.

It is possible to call the edit process repeatedly without calling the save process. Edit has an overloaded semantic meaning that is based on the context in which it is invoked. If the edit process is called repeatedly without calling save, the result is a nested set of changes that can be separately saved or undone. This support for nested change lists is intended to enable applications such as the console to more easily implement wizard like functionality in which a larger process is broken down into more discrete steps, each of which is separately validated. This functionality is also considered useful when developing modular scripts. In such scripts it is common to bracket a process with edit and save calls for the purposes of guaranteeing that all of the code in a single process is grouped. The description of the save process provides a more complete description of the behavior when edit calls are nested.

In one embodiment, changes are tracked based on the identity of the user that is making them and that the user identity is used as the token that binds all changes being made. If two administrators were to log in with the same user identity and begin making changes, these changes would be collected into a single set of changes.

The getCurrentEditor process provides a means by which the administrator can determine the identity of another administrator that is in the process of making changes. This is intended to provide an option by which a user can use other means to acquire access to the configuration such as calling the other administrator on the phone and asking them to either complete or abandon their changes.

The getChanges process provides a means by which the administrator can obtain information about pending changes. The return value is a TabularData list and each entry is of type CompositeData and contains a single change associated with a particular JMX Object Name. The key for the TabularData is the object name of the value being changed. In one embodiment, the changes that are returned are only those for the local scope. Additions and deletions are a special case of modifications that involves the addition or removal from a parent object. The fields are defined as follows:

ObjectName identifier—The Object Name of the entity for which the change is made.
    Change—A CompositeData instance with the following attributes
    String attributeName—of the attribute being changed
    String operation—one of "modify", "create", "destroy", "add", "remove", "unset"
    Object newValue—of the attribute
    Object oldValue—of the attribute In one embodiment, when multiple attributes are modified for the same Object, each is listed as a separate entry. For the "create" and "add" operations, only the new value will have meaning. For the "destroy", "remove" and "unset" processes, only the oldValue will have meaning. This approach was taken so as to normalize and simplify the contents of the collection that is returned. The "add" and "remove" operations are used to distinguish modifications to attributes that are collections of primitive types or references. The "create" and "destroy" operations are equivalent to the "add" and "remove", but are used in the case where the value is that of an MBean which is contained. In such cases the values are those of the created or destroy MBean.

Note that the getChanges and getAllChanges process function in the same way even if the current user does not have the lock.

The save process validates and persists any outstanding changes. In the event that there have been nested edit calls the behavior is to merge the changes into the enclosing change list. The following semantics are used.

In the event that an attribute is modified more than once, the newValue in the enclosing change list is modified to the newValue in the currently outstanding changes and the existing oldValue in that change entry is left intact.

In the event that a previously set value is unset, both operations are removed from the resulting change list.

In the event that an "add" of attributes is followed by a "remove" of the values, these operations offset one another and are removed from the list.

In the event that a "remove" of attributes is followed by an "add" of the values, these operations are represented in the change list as they result in the setting of the object back to its default value. Changes made to the object prior to the remove call are not included in the change list.

In the event that an object was the subject of a "create" in an enclosing change list and is the subject of a "destroy" in the new change, list both of the operations are removed. Any modifications to attributes of that object are removed.

In the event that an object that was the subject of a "destroy" in an enclosing change list and a "create" in the new change list, the operations are merged into the enclosing change list and ordered such that the deletion precedes the creation. This is done so that the newly create value will revert to having all of the default values.

If this is the outer most change list, the changes are first validated to ensure that the new configuration is consistent. If the validation fails, a ValidationException is thrown. The ValidationException contains specific information about what went wrong. The changes remain outstanding and the configuration file remains locked in this case.

The user can retrieve the list of validation failures by calling the process getValidationErrors. This process retrieves a collection of Changes with an additional attribute that describes the problem associated with particular change.

ObjectName identifier—The Object Name of the entity for which the change is made.
Change—A CompositeData instance with the following attributes
String attributeName—of the attribute being changed
String operation—one of "modify", "create", "destroy", "add", "remove", "unset"
Object newValue—of the attribute
Object oldValue—of the attribute
String errorMessage—that describes the problem.

The SaveFailedException is thrown in the event that the configuration file cannot be written or if a different user had broken the lock.

The administrator can make further changes to the configuration and then invoke the save process again. When the validation and persistence of the configuration is complete the file is unlocked and these changes are considered to be pending activation and the configuration is said to be in the modified state.

The undo process reverts the inner most set of nest changes. The undoAll process is used to abandon all pending changes. If there is only one layer of nested edit, the undo and undoAll processes are equivalent. The result is that the system is left in the state that it was prior to the pervious edit invocation.

getUnactivatedChanges( ): TabularData
undoUnactivatedChanges( ): void
activate(int waitTimeInMillis): ObjectName
getCompletedActivationTasks( ): ObjectName[ ]
purgeCompletedActivationTasks( ): void The getUnactivatedChanges process returns a collection of change lists as described in the getChanges process. The change list that is returned is the composite of all of the edit and save operations since the last call to activate. In one embodiment, the individual change lists are not maintained.

In one embodiment, the undoUnactivatedChanges process will revert any changes that have been saved but not activated. In this case, individual changes lists are not maintained and it is not possible to perform partial rollbacks.

The activate process initiates the distribution and ultimate persistence of a prepared set of changes that have previously been saved. It returns the ObjectName of an ActivationTask that is used to track the completion of those changes. The distribution of changes can take some time as that involves transferring the configuration to each of the managed servers that are involved in the change. A waitTimeInMillis specifies the number of milliseconds that the process will block until the associated ActivationTask runs to completion. A value of 0 will result in an immediate return. A value of −1 will result in the process blocking indefinitely.

In one embodiment, some changes cannot be made dynamically. When a new configuration is distributed to the managed servers, each individual server determines if there are any attributes that require that the server be restarted. In such cases, none of the changes are put in place until the server is rebooted. If it is successfully loaded it becomes the "active" configuration. In the event that the changes are not accepted, the server will not restart. This is to guarantee that the admistrator has complete control over the configuration.

The getCompletedActivationTasks process is used to review recently completed modifications to the configuration. While the purgeCompletedActivationTasks clears all activation tasks that have completed.

For each group of changes that are activated, there is ChangeTask that reflects the state of those changes. It is represented in the JMX server with an ObjectName of the form. The presence of the type tag makes it possible to query all instances of this type. The changeIdentifier is a unique identifier that is generated by the system. It is a monotonically increasing ordinal.

<domain_name>:Name=<changeIdentifier>
Type=ActivationTask

The purpose of this object is to provide information about the Activation task. To make this information as accessible as possible to clients it is returned through data structures that are compliant with the OpenMBeans specification. At the point where a call is made to finishChanges, a task can only run to completion and is not abandoned unless it fails.

getuser( ): String
getchanges( ): TabularData
getStatus( ): String
getStatusByServer( ): TabularData
getStartTime( ): Long
getCompletionTime( ): Long
waitForCompletion( ): Integer The getuser process returns a String that represents the identity of the user that initiated the transaction.

The getchanges process returns a table of information. The index of the table is the ObjectName of an MBean that was modified and the CompositedData for that entry consists of the attribute and new value to which it is being set.

The getStatus process returns an Integer that reflects the overall state of the change. In one embodiment, the overall state of the change may be one of the six following states:
1. new—task created without the distribution being started.
2. distributing—the changes have been validated and are being distributed to the various servers.
3. distributed—the changes have been distributed to all or a particular server.
4. pending—the configuration changes require that the server be restarted for the change to be completed.

5. committed—the changes have been distributed to all servers and made permanent.
6. failed—the changes failed in the distribution phase.

The getStatusByServer processes provide status on a per server bases. The result is indexed by the name of the server and the value in each CompositeData member includes one of the above status codes as well as a reference to another TabularData object containing a list of exception information in the event of failure.

The getStartTime and getCompletionTime return the beginning and end times for the specified task. The startTime is counted from the time at which the startChanges process was invoked.

The waitForCompletion process blocks in the JMX server while the specified task is completed and returns when the state is transitioned to either "failed" or "completed".

Each ChangeTask is a NotificationBroadcaster. As such it is possible to track the progress of a ChangeTask by registering as a Listener for Change Notifications Events are generated for each individual server involved in the change as well as for the task itself. Each notification is of the form:

weblogic.activationtask.state. [server|task].<status>

Where status is the lower case string of each of the status listed above.

The UML state diagram below describes each of the major states through which the configuration management process is advanced. Each of the arrows represents either the invocation of a process on the ConfigurationManager or the result of the completion of a distribution action. When the configuration management subsystem is in a given state only those processes, which are represented as arrows, are eligible for invocation. Invoking other processes will result in the throwing of an exception. For example, when the configuration is in the activated state all changes must be preceded by an initial invocation of the "edit" process. This diagram is intended to act as a supplement to the APIs described above and to place them in context to one another.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, making batch configuration changes.

The invention claimed is:

1. A method for validating a set of configuration changes, comprising:
   receiving a configuration file update by a managed server, wherein the configuration file update includes a set of changes to a configuration for the managed server;
   storing the configuration file update in a storage medium;
   comparing the set of changes to a plurality of managed server configuration MBeans in an MBean graph, wherein the plurality of managed server configuration MBeans are related to each other by the MBean graph, wherein the plurality of managed server configuration MBeans are associated with a running state of the managed server;
   determining based upon a result of the comparing step whether to accept the set of changes to the managed server; and
   generating a validation response signal indicating at least one of an acceptance or a rejection based upon a result of the determining step.

2. The method of claim 1, wherein receiving a set of changes to a configuration further comprises:
   receiving a plurality of changes comprising a batch.

3. The method of claim 1, wherein determining based upon a result of the comparing step whether to accept the set of changes further comprises:
   determining based upon a result of the comparing step to accept the set of changes, if each one of the set of changes does not cause an error to occur.

4. The method of claim 1, wherein determining based upon a result of the comparing step whether to accept the set of changes further comprises:
   determining based upon a result of the comparing step to accept the set of changes, if each one of the set of changes does not cause an undesired state to be entered.

5. The method of claim 1, wherein determining based upon a result of the comparing step whether to accept the set of changes further comprises:
   determining based upon a result of the comparing step not to accept the set of changes, if at least one of the set of changes causes an error to occur.

6. The method of claim 1, wherein determining based upon a result of the comparing step whether to accept the set of changes further comprises:
   determining based upon a result of the comparing step not to accept the set of changes, if at least one of the set of changes causes an undesired state to be entered.

7. The method of claim 3, wherein indicating at least one of an acceptance or a rejection based upon a result of the determining step further comprises:
   signaling an administration server indicating the set of changes are accepted, if a result of determining based upon a result of the comparing step is to accept the set of changes.

8. The method of claim 5, wherein indicating at least one of an acceptance or a rejection based upon a result of the determining step further comprises:
   signaling an administration server indicating the set of changes are not accepted, if a result of determining based upon a result of the comparing step is to not accept the set of changes.

9. A computer-readable medium carrying one or more sequences of instructions for validating a set of configuration changes, which instructions, when executed by one or more processors, cause the one or more processors to carry out the steps of:
   receiving a configuration file up date by a managed server, wherein the configuration file up date includes a set of changes to a configuration for the managed server;
   storing the configuration file update in a storage medium;
   comparing the set of changes to a plurality of managed server configuration MBeans in an MBean graph, wherein the plurality of managed server configuration MBeans are related to each other by the MBean graph, wherein the plurality of managed server configuration MBeans are associated with a running state of the managed server;
   determining based upon a result of the comparing step whether to accept the set of changes to the managed server; and
   generating a validation response signal indicating at least one of an acceptance or a rejection based upon a result of the determining step.

10. The computer-readable medium of claim 9, wherein the instructions for receiving a set of changes to a configuration further comprise instructions for carrying out the step of:
    receiving a plurality of changes comprising a batch.

11. The computer-readable medium of claim 9, wherein the instructions for determining based upon a result of the comparing instructions whether to accept the set of changes further comprise instructions, which when executed by the one or more processors cause the one or more processors to carry out the step of:
    determining based upon a result of the comparing instructions to accept the set of changes, if each one of the set of changes does not cause an error to occur.

12. The computer-readable medium of claim 9, wherein the instructions for determining based upon a result of the comparing instructions whether to accept the set of changes further comprise instructions, which when executed by the one or more processors cause the one or more processors to carry out the step of:
    determining based upon a result of the comparing instructions to accept the set of changes, if each one of the set of changes does not cause an undesired state to be entered.

13. The computer-readable medium of claim 9, wherein the instructions for determining based upon a result of the comparing instructions whether to accept the set of changes further comprise instructions, which when executed by the one or more processors cause the one or more processors to carry out the step of:
    determining based upon a result of the comparing instructions not to accept the set of changes, if at least one of the set of changes causes an error to occur.

14. The computer-readable medium of claim 9, wherein the instructions for determining based upon a result of the comparing instructions whether to accept the set of changes further comprise instructions, which when executed by the one or more processors cause the one or more processors to carry out the step of:
    determining based upon a result of the comparing instructions not to accept the set of changes, if at least one of the set of changes causes an undesired state to be entered.

15. The computer-readable medium of claim 11, wherein the instructions for determining based upon a result of the comparing instructions whether to accept the set of changes further comprise instructions, which when executed by the one or more processors cause the one or more processors to carry out the step of:
    signaling an administration server indicating the set of changes are accepted, if a result of determining based upon a result of the comparing instructions is to accept the set of changes.

16. The computer-readable medium of claim 12, wherein the instructions for determining based upon a result of the comparing instructions whether to accept the set of changes further comprise instructions, which when executed by the one or more processors cause the one or more processors to carry out the step of:
    signaling an administration server indicating the set of changes are not accepted, if a result of determining based upon a result of the comparing instructions is to not accept the set of changes.

17. A managed server for validating a set of configuration changes, comprising:
    a processor; and
    one or more stored sequences of instructions which, when executed by the processor, cause the processor to carry out the steps of:
      receiving a configuration file update by a managed server, wherein the configuration file update includes a set of changes to a configuration for the managed server;
      storing the configuration file update in a storage medium;
      comparing the set of changes to a plurality of managed server configuration MBeans in an MBean graph, wherein the plurality of managed server configuration MBeans are related to each other by the MBean graph, wherein the plurality of managed server configuration MBeans are associated with a running state of the managed server;
      determining based upon a result of the comparing step whether to accept the set of changes to the managed server; and
      generating a validation response signal indicating at least one of an acceptance or a rejection based upon a result of the determining step.

18. The method of claim 1, wherein comparing the configuration file update to one or more configuration MBeans in an MBean graph is performed using a MBean tree differencing mechanism, wherein a persisted configuration is retrieved into the one or more MBeans related to one another by a graph, tree, or similar data structure.

19. The method of claim 1, wherein comparing the configuration file update to one or more managed server configuration MBeans in an MBean graph comprises:
- reading the configuration file update into the MBean graph;
- performing a depth first traversal of the MBean graph starting at the root node of the MBean graph;
- for each MBean node, comparing primitives of the MBean node with a current configuration stored at the managed server; and
- storing changes in a list of events, which may be played against the current configuration MBean graph to yield an updated configuration MBean graph.

20. The method of claim 1, wherein one or more MBeans comprise properties of primitives and child beans.

* * * * *

UNITED STATES PATENT AND TRADEMARK OFFICE
CERTIFICATE OF CORRECTION

PATENT NO. : 7,529,818 B2  Page 1 of 2
APPLICATION NO. : 11/130733
DATED : May 5, 2009
INVENTOR(S) : Eric M. Halpern et al.

It is certified that error appears in the above-identified patent and that said Letters Patent is hereby corrected as shown below:

On the face page, in field (75), in "Inventors", in column 1, lines 2-3, delete "San Francisco, CA (US);" and insert -- Newton, MA (US); --, therefor.

On page 2, in column 2, under "Other Publications", line 19, delete "Optimizaton" and insert -- Optimization --, therefor.

On sheet 1 of 3, in Figure 1, in "Reference Numeral 130", line 3, delete "Manged" and insert -- Managed --, therefor.

In column 1, line 38, delete "2001. BEAS-01077 us2," and insert -- 2001, --, therefor.

In column 3, line 20, after "be" delete "the".

In column 5, line 49, delete "waitTimeinMillis" and insert -- waitTimeInMillis --, therefor.

In column 5, lines 53-54, delete "timeOutinMillis" and insert -- timeOutInMillis --, therefor.

In column 8, line 24, delete "admistrator" and insert -- administrator --, therefor.

In column 8, line 44, delete "getuser( ):" and insert -- getUser( ): --, therefor.

In column 8, line 45, delete "getchanges( ):" and insert -- getChanges( ): --, therefor.

In column 8, line 52, delete "getuser" and insert -- getUser --, therefor.

In column 8, line 54, delete "getchanges" and insert -- getChanges --, therefor.

In column 9, line 6, delete "ComposisteData" and insert -- CompositeData --, therefor.

In column 11, line 26, in claim 9, delete "up date" and insert -- update --, therefor.

Signed and Sealed this

Eighth Day of June, 2010

David J. Kappos
*Director of the United States Patent and Trademark Office*

In column 11, line 27, in claim 9, delete "up date" and insert -- update --, therefor.